C. W. REQUA.
Oil Still.
No. 77,094.
Patented April 21, 1868.
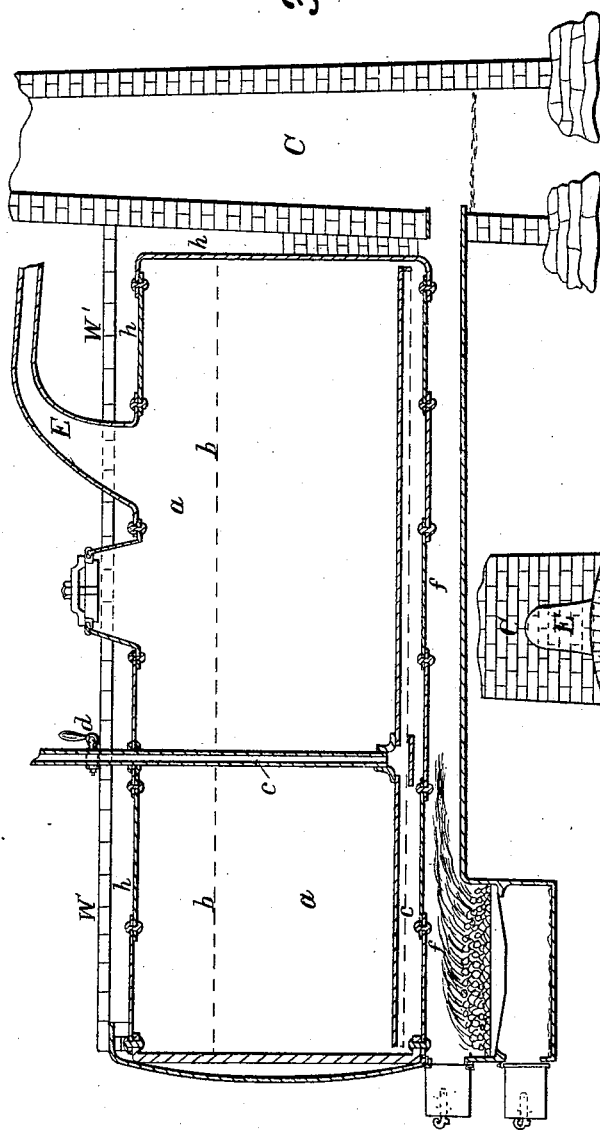

United States Patent Office.

CHARLES W. REQUA, OF ALBANY, NEW YORK.

Letters Patent No. 77,094, dated April 21, 1868.

---

IMPROVEMENT IN STILLS FOR DISTILLING HYDROCARBONS.

---

*The Schedule referred to in these Letters Patent and making part of the same.*

---

TO ALL WHOM IT MAY CONCERN:

Be it known that I, CHARLES W. REQUA, of the city of Albany, and county of Albany, and State of New York, have invented a new and useful Improvement in the Distillation of Liquid Hydrocarbons; and that the following, in connection with the drawings, is a full, clear, and exact description thereof.

When petroleum, the liquid products obtained from the distillation of coal, or other hydrocarbons in a liquid state, are subjected to distillation in stills heated by an external fire, as heretofore arranged, it is well known that the process requires a very high degree of heat, and great care to prevent burning or coloring the distillate obtained. It is also very slow in operation after the most volatile of the vapors formed have passed off, and hence requires the heat to be increased just in proportion as the liquid on which it acts loses the conservative elements which prevent that action from being destructive. Much fuel, therefore, not only is required, and much time lost, but from the united effect of the intense heat necessary, and the absence of motion in the heavy liquids remaining in the stills when the operation is drawing to its close, coke is formed, and becomes encrusted on the bottom of the still, which not only delays the distillation still farther, but must be removed by scraping after each distillation, and soon destroys the still. To avoid these difficulties, refiners have resorted to many expedients, and devised much complicated and costly machinery, as, for instance, agitators with curiously-formed arms, oscillating and revolving stills, heating by superheated steam, combinations to distill *in vacuo*, &c., but hitherto all these devices, on account of their great cost and complication, have been abandoned, and the old method of progressive external heating by fire, despite the grave objections to it, is now the method generally used. Indeed this method is simpler, and, therefore, better than any other, if only the objections attending its ordinary application are removed, and it was to accomplish that purpose that I made the experiments which led me to the discovery I am now about to describe.

My improvement consists in arranging stills heated by an external fire, so that steam can be introduced into the liquid contained in them, while it is being distilled, at such pressure, and in such a manner that it will regulate the heat inside the still, and at the same time distribute it throughout the liquid by causing currents therein to produce a rapid and continuous interchange of position between the portion of said liquid next the lower side of the still exposed to the fire, and the portion of said liquid in the upper part of the still not exposed to the direct action of the fire, whereby said liquid is not only vaporized more rapidly, and with far less heat, than when the heat acts upon the mass by conduction alone, but is also prevented from burning on or encrusting the bottom of the still. The vapors also being mixed with the steam, pass away rapidly, and are not scorched or colored—an advantage hitherto only obtained by distilling *in vacuo*. Again, when my improvement is used, the still can be set, so that its upper part will be surrounded with an air-chamber to economize the heat, instead of being exposed to the cooling action of the atmosphere, as is usual in this country, the steam, from its conservative action, permitting such an arrangement; and, what is of great advantage, an improved construction can be used to give to the still an increased working capacity without augmenting the fire-surface, and stills can be built to secure the greatest economy and capacity, and not, as heretofore, flat, shallow, and uneconomical.

The nature of my improvement being the use of steam, as and for the purpose above described, it is not necessary to describe its application to more than one of the different kinds of stills in use, as, from that description, it will be readily seen how it can be adapted to stills of any form. In my illustrations, therefore, I will confine myself to the horizontal-cylinder still, as, to introduce my improvement in that form of still, it is only required to lead into it a steam-pipe terminating in a T-end extending lengthwise through the still, and so perforated and located in the still that the steam will be discharged in jets with sufficient force, and near enough to the bottom of the still, and in such direction, that continuous currents will be formed across said bottom from the steam-pipe outwards. In the drawings—

Figure 1 is a longitudinal section of a horizontal-cylinder still with my improvements added.

Figure 2 is a transverse section of the same.

Figure 3 is a transverse section of the horizontal steam-pipe, showing the perforations in it.

In figs. 1 and 2, $a\ a$ is the still; $b\ b$, the height of the liquid in it; $c\ c\ c$, the steam-pipe; $d$, a cock outside of the still to regulate the admission of steam; $e$, the exit-pipe leading to the worm; $f\ f$, the furnace and flue under the still, the latter extending back its entire length; $w\ w$, the side walls of said furnace and flue; $w'\ w'$, the arch to make an air-chamber over the still; $h\ h$, the said air-chamber; $C$, the chimney.

The still and its connections being constructed and arranged as above described, and as illustrated in the drawings, the mode of operation is as follows: The still being filled to the proper height with the liquid to be distilled, and the fire started, the operation may go on until the more volatile of the hydrocarbons in the liquid are expelled, or until the temperature is raised to 212° Fahrenheit. The steam is then admitted, and continued until the distillation is completed. The residuum, as there is no coke in it, can then be drawn off, and the still filled again, and operated as before; or, when the liquid distilled is petroleum or coal-tar, the operation can continue until the paraffine (to extract which by the old methods requires a separate and new operation, and destructive heat,) is also expelled, and nothing is left but a worthless residuum.

In my experiments in distilling petroleum, I used ordinary steam of a comparatively low temperature, and found it entirely successful, but when the liquids are more refractory, steam of a higher temperature, as experience will readily teach, can, of course, be used. In these experiments I obtained the following results:

First, an economy in fuel of from thirty to forty per cent., as the distillation, instead of continuing three days, and, towards the close, requiring a heat of 800°, as was the case before I used the steam, was entirely finished in two days, and the highest heat used was only about 400°. The addition of steam, therefore, increased the capacity of the works full fifty per cent.

Second. From the regulation and distribution of the heat caused by the action of the steam, and the consequent low temperature at which the oil was distilled, the entire distillate was a standard white oil—by the old method it would have been light straw, or light straw to white—and therefore required less acid to deodorize it than if it had been made by the old process. As, from the low temperature, no uncondensable gases were formed, more also of the volatile parts (by the old process run in with the naphtha) were now run in with the oil, thus increasing the product four per cent. without lowering the fire-test, and making the entire gain of the new process over the old, quality and quantity being both estimated, full ten per cent.

Third. The residuum left in the still, after the oil was expelled from it, was entirely fluid, and free from coke, and, therefore, would run out through the tar-cock. Thus my improvement not only avoids the expense and delay of cooling off and scraping, but also the constant burning out of the still-bottom caused, in the old method, by the coke formed burning upon it.

Fourth. The tar, being free from coke and grit, is greatly enhanced in value, as it can be converted at a small expense into good lubricating-oil, or, as I have explained already, can be treated for paraffine without removal from the still, or injury to it, the steam rendering unnecessary the excessive and destructive heat now required in the manufacture of paraffine.

Now, I am aware that steam has been used, in the distillation of coal to obtain coal-oil, in order to conserve the vapors formed and hasten their exit from the hot retort, and also that superheated steam has been used as a means of heating oil-stills, both with and without furnace-heat, but, to the best of my knowledge, these uses of steam have been unlike mine, and generally have required complicated and expensive machinery, whereas my method can be attached to any still with very little expense, is entirely safe, and yet accomplishes results more favorable even than those obtained from distilling *in vacuo*, without any of the expense and complication attending that method.

What I claim, and desire to secure by Letters Patent, is—

1. The use of steam in the distillation of liquid hydrocarbons in stills heated by external fire, when the steam is introduced into the still in such a manner that the lowest stratum of liquid therein will be continually removed from contact with the bottom of the still by the action of the steam, and its place supplied with fresh liquid from above, substantially as and for the purpose above described.

2. I claim constructing stills heated by an external fire, and in which steam is used, as and for the purpose above described, with an air-chamber over them, constructed and operating substantially as and for the purpose above described.

CHARLES W. REQUA.

Witnesses:
H. Q. HAWLEY, Jr.,
JAMES B. SANDERS.